United States Patent [19]
Yi et al.

[11] Patent Number: 5,804,106
[45] Date of Patent: Sep. 8, 1998

[54] MANUFACTURING METHOD FOR UV-SCREENING PHOTOCHROMISM EYE GLASSES

[75] Inventors: Chiu Jen Yi, Taipei Hsien; Cheng Tsu Chen, No. 27-14, Hsia Hu, Quai Shan County, Taipei Hsien; Huang Lung Shen, Pan Chiao; Yang Yeh Ho, No. 15, Alley 21, Lane 56, Sec. 1, Chung Yuan Road, Long Tan County, Tao Yuan Hsien, all of Taiwan

[73] Assignees: Cheng Tsu Chen; Yang Yeh Ho, both of Tao Yuan Hsien, Taiwan

[21] Appl. No.: 889,964

[22] Filed: Jul. 10, 1997

[51] Int. Cl.$^6$ ....................................................... B29D 11/00
[52] U.S. Cl. ............................................... 264/1.1; 264/28
[58] Field of Search .............................. 264/1.1, 1.7, 2.2, 264/28

[56] References Cited

U.S. PATENT DOCUMENTS 3,716,489 2/1973 DeLapp ..................................... 264/1.7
4,968,454 11/1990 Crano et al. .

*Primary Examiner*—Mathieu D. Vargot
*Attorney, Agent, or Firm*—Rosenberg, Klein & Bilker

[57] ABSTRACT

The manufacturing process for UV-screening photochromism eye glasses is based on the use of polycarbonate, polymethyl methacrylate or Nylon as substrate to be mixed with spironaphthoxazine or its derivative as photochromism agent along with carrier, hindered phenol type antioxidant, silicone coupling agent, organic phosphorous stabilizer, piperidine type light stabilizer, and UV-absorbent. By mixing two of the last three ingredients and all other substances thuroughly, the mixture is frozen ground or mechanically pulverized to fine particles for injection molding to produce a long-term stable UV-screening photochromism eye glasses.

1 Claim, 2 Drawing Sheets

MANUFACTURING METHOD FOR UV-SCREENING PHOTOCHROMISM EYE GLASSES

SCOPE OF INVENTION

This invention is related to the manufacturing method for UV-screening photochromism eye glasses, particularly for photochromism glasses under sunshine.

BACKGROUND AND TRADITIONAL TECHNIQUES

As the essential instrument for visual sensibility, eyes represent spiritual window of human being and should be protected against irritation or interference. The use of sun glasses or plain glasses is popular for protection, but their action is to isolate strong illumination or ultraviolet rays (UV) in a passive mode, with partial screening of strong light but not effective against the more harmful UV-light. The reason lies in the fact that these sun glasses are made from vapor coating of glasses with UV absorbing or screening substance for certain wavelength band, but the coating process cannot eliminate the effect of UV-light with shorter wavelength, which can injure eyes significantly.

In addition, the multi-layer vapor coating process for eye glasses is unable to treat the whole spectacles, for which the frames should be separated first before vapor coating. There are two disadvantages in this regard, namely, more time and labor are involved for coating and assembly of spectacles, and thick glasses are used as substrate, the weight of which can cause uncomfortable feeling for people wearing glasses.. Thus, it is necessary to solve these deficiencies in fabricating sun or plain glasses.

Furthermore, for conventional sun or plain glasses, there is no mechanism to control automatically the light intensity impinging on eyes under different weather conditions. For example, under strong sunshine, sun glasses are needed, however, under cloudy weather or indoor, sun glasses are no longer necessary, and vice versa for plain glasses. Practically, this problem of adjustment to light intensity is not desirable for people wearing sun glasses.

In the U.S. Pat. No. 276,304 of ROC: [Thin Film for Light Absorption and Anti-Reflection in Sun Glasses], the claim involves the use of passive anti-reflection principle to block strong outdoor light without prevention against UV effect. As used solely as sun glasses, they are heavy in weight, but without self-adjustment to light intensity.

Another U.S. Pat. No. 281,303 of ROC: [Glasses with Light Shade], also in the U.S. Pat. No. 299,042 of ROC: [Assembly of Sun Spectacles with Clip-On for Hat], both claims can be considered as sunscreening attachment to ordinary plain glasses with added weight. Besides, the combination of glasses with different refraction or convergence is not helpful in protecting eyes or effective in reducing the hazard of UV-light.

SUMMARY OF THE INVENTION

The main purpose of this invention is to provide a manufacturing method for UV-screening photochromism glasses, particularly for glasses to be in active mode for absorption of strong light and UV-light, producing deep blue, deep red and other dark colors in protecting eyes against the penetration of strong light and UV-light.

Another purpose of this invention is to provide a manufacturing method for UV-screening photochromism glasses, in which the glass part and spectacle frame can be molded as a single piece. Such an approach can reduce the weight of spectacles and also the production cost for light-weight sun glasses.

To achieve above-mentioned purposes, this invention involves the use of polycarbonate, polymethyl methacrylate or Nylon as substrate, with additives for photochromism consisting of spironaphthoxazine or its derivatives, anti-oxidant from hindered phenols, organic silicon coupling agent, organic phosphorous stabilizer and light stabilizer from organic amine derivative along with UV-screen agent. Among the last three additives, two are chosen and mixed uniformly for freeze-grinding to micro-particles, which are processed through injection molding machine to form glasses and frame as a whole piece. The product actively absorbs strong light and UV-light with special photochromism characteristics. steps:

DETAILED DESCRIPTION OF PREFERRED EMBODIMENT

Figure 1:
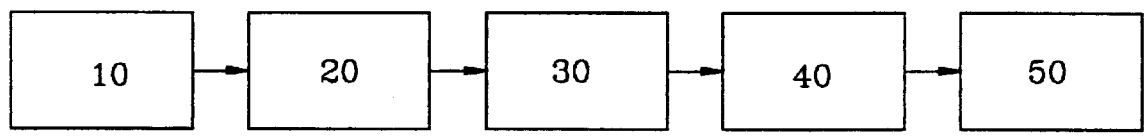
FIG. 1 is a flow chart of the manufacturing process in following coded
10 Addition of photochromism agent and carrier
20 Addition of anti-oxidant and coupling agent
30 Addition of other additives
40 Mixing, low temperature freeze-grinding/pulverization
50 Injection molding or press forming

The flowsheet for this invention is shown in FIG. 1, in which the substrate is polycarbonate, polymethyl methacrylate or Nylon. In Step 10, photochromism agent and carrier are added to the selected substrate. Spironaphthoxazine or its derivative is used here for explanation, however, it is not limited by this example. The structures of spironaphthoxazine and its derivative are shown in [A] and [B] respectively as following:

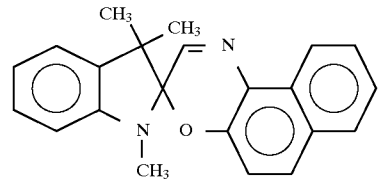

[A] Spironaphthooxazine

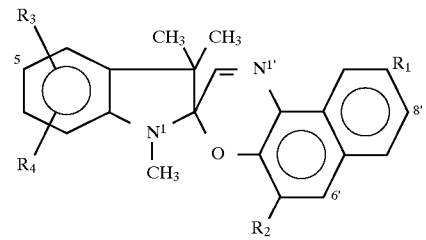

[B] Spironaphthooxazine derivative in which R1, R2, R3 and R4 are respectively hydrogen or halogen atoms, or alkyl groups. Since the preparation of such photochromism agent is not within the scope of this invention, the properties of this agent can be found in SPIE, Vol. 562(1985), pp.6–9. Besides, better carrier can be obtained from microcapsulated particles with a mixing ratio of photochromism agent to carrier between 1:15 to 1:1000. In this invention, the color series of said mixture is based on reddish violet carrier or bluish violet carrier.

For Step 20 in FIG. 1, it involves the addition of antioxidant and coupling agent. The antioxidant is selected from hindered phenol with structure of [C] as following:

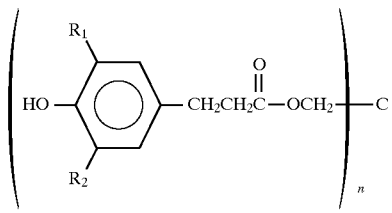

[C] Hindered phenol as antioxident in which R1 and R2 represent methyl to propyl group and n being an integral number. The coupling agent used in this invention is either [D] or [E] as following:

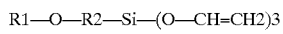

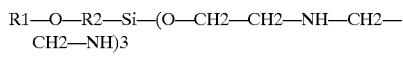

in which R1 is a methyl to pentyl group and R2 is —O—(CH2)n where n is an integer, being optimally in the range of 1~3. The purpose for adding the coupling agent is to provide uniform mixing of additives including photochromism agent in the substrate matrix without migration to the surface.

For Step 30 in FIG. 1, other additives, including (i) organic phosphorous stabilizer [F], (ii) light stabilizer of amine series [G] and (iii) UV screening agent [H—I], are added to the formulation with following structure formula:

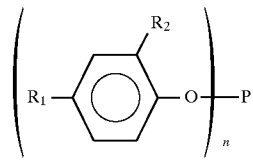

[F] Organic phosphorous stabilizer where R1 and R2 represent respectively methyl to butyl group and n between 3 or 4.

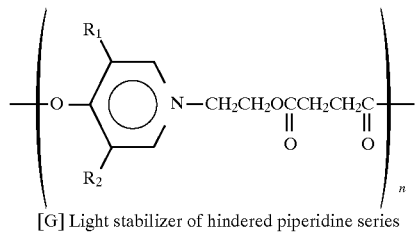

[G] Light stabilizer of hindered piperidine series in which R1 and R2 represent respectively H or methyl-butyl group and n is an integer between 3~6.

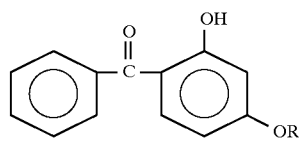

[H] UV-screening agent in which R is a methyl to decyl group.

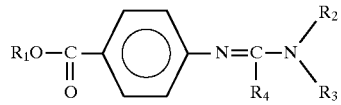

[I] UV-screening agent in which R1, R2 and R4 are respectively H or methyl~butyl group and R3 is a phenyl or substituted phenyl group.

In Step 30, at least two of these three additives should be used, while the use of all three can develop the best effect for long-term photochromism result.

In Step 40 of FIG. 1, it involves the mixing of ingredients in Steps 10, 20 and 30 and subsequent grinding. The mixture of these additives and substrate matrix is frozen between 0° and −40° C. and then ground in a pulverizer to particles of 0.1~0.7 mm dia. Since the photochromism agent, spironaphthoxazine, decomposes at 200° C., it is necessary to use low temperature for stabilization in grinding and for ease of subsequent injection molding in Step 50. The molding operation is affected by the use of injection molding machine or press at 180~200° C. with a pressure of 500~2000 kg/sq.cm. The molded product is illustrate in FIG. 2 as phtochromism glasses 100 and frame 200 in a single piece. However, this invention is not limited to the illustration shown in FIG. 2 in addition, the hanger 300 can also be formed simultaneously with glasses 100 and frame 200 through Steps 10 to 50. It means, that the present invention can lower the cost and man-hour in the production of wind protection, and strong light screening glasses.

Figure 2:
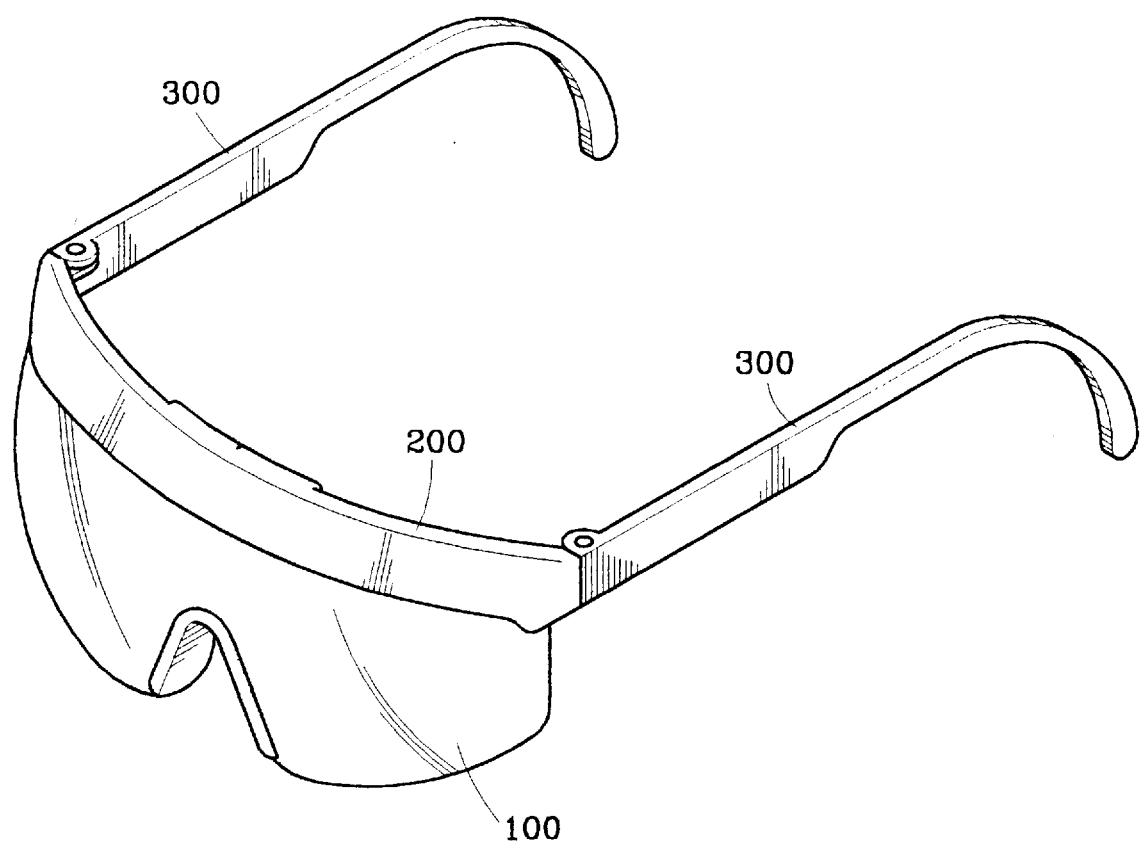
FIG. 2: Outer appearance of spectacles prepared by this invention
100 Glasses
200 Frame
300 Hanger

The spectacles shown in FIG. 2 used in outdoor will change color to reddish violet or bluish violet, pending to the color of carrier used in the formulation. This phenomenon is due to the excitation of electrons in the photochromism agent to induce photo-decomposition or photo-isomerization of its molecular structure, along with the change of color to the color of original carrier. In this invention, the range of absorbance band is dependent on the color of the carrier. In the use of bluish violet carrier, the absorbed wavelength is in the range of 385~305 nm, while in the use of reddish violet carrier, the absorbed wavelength range is between 300~400 nm, that means, UV-light and strong light that can directly injure human eyes are completely absorbed by such formulation with automatic color change of the glasses similar to dark sun glasses for eye protection.

Besides, the spectacles shown in FIG. 2, the color change is a reversible reaction. When outside UV-light or light diminishes in intensity or disappeared such as sudden weather change or inside buildings, the spectacles will return to its original color as plain glasses. In other word, the spectacles made from this invention have the functions of sun glasses as well as plain glasses, and absorb UV-light and strong light in the active mode.

The ranges of additives used in the Steps 10~50 of FIG. 1 are listed in the following Table:

| Raw Material | Amount added, % | Optimum Range, % |
|---|---|---|
| Substrate | 70~91 | 75~91 |
| Photochromism agent | 0.1~10 | 2~7 |
| Carrier | 0.05~2.0 | — |
| Coupling agent | 1~8 | 1~5 |
| Hindered phenol anti-oxidant | 0.05~3 | 0.5~2 |
| Organic phosphorous stabilizer | 2~5 | — |
| Amine type light stabilizer | 0.1~4 | 0.1~2.5 |
| UV-Screening agent | 0.5~3 | 0.8~1.5 |

In this Table, the ranges are expressed as weight percentages of each ingredient to be used as basis of calculation, and the substrate refers to either PC, PMMA or Nylon or other polymers suitable for injection molding or press forming.

Furthermore, the ratios of ingredients are typical figures in mixing, the variation of which will influence the color stability in the service life of photochromism effect. In the following examples No. 1–7 of actual practice, such variation in effect is illustrated by these examples, however, this only serves for comparison purpose and shall not limit the scope of this invention.

EXAMPLES

Case I

1. The substrate in this example is polycarbonate, with the following ingredients and respective weight percentages:

| [a] Spironaphthoxazine | 7% |
|---|---|
| [b] Carrier (bluish violet or reddish violet) | 2% |
| [c] Silicone coupling agent | 1% |
| [d] Irganon 1010 anti-oxidant | 2% |
| [e] Phosphite 168 stabilizer | 2% |
| [f] Tinuvin 622 light stabilizer | 1% |
| [g] Chimassorb 81 UV-absorbent | 1.2% |

2. The carrier used in above example is from photorone plate and photorome series produced by Japan Keix Co., Ltd.

3. The silicone coupling agent for [c] is a commercial product.

4. Irganon 1010 for [c] is an antioxidant from Ciba-Geigy, with following structure:

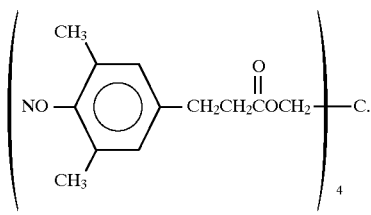

5. The organic phosphorous stabilizer in [e] is Phosphite 168 from Ciba-Geigy, with following structure:

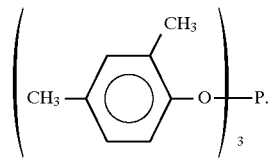

6. Tinuvin 622 is a hindered piperidine type light stabilizer, polyester of succinic acid with N-β-hydroxyethyl-2,2,6,6-tetramethyl-4-hydroxypiperidine, from Ciba-Geigy.

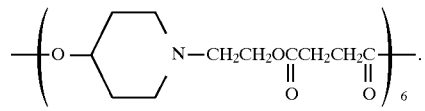

7. The UV-absorbent [g], Chimassorb 81, from Ciba-Geigy has the following structure:

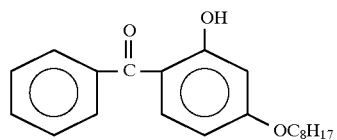

8. The spectacles prepared from above formulation had been tested by irradiation under UV-lamp with a retention of light stability of 560 hours, for which the photochromism of the product could be kept.

9. The following examples for light stability tests under various formulations are shown in the Table below:

| Compo-nent\No. | 1 | 2 | 3 | 4 | 5 | 6 | 7 |
|---|---|---|---|---|---|---|---|
| Polycarbonate | 82.8% | 84.8% | 83.5% | 83.5% | 85% | 88% | 91% |
| Spironaphthoxazine | 7 | 7 | 7 | 7 | 7 | 7 | 7 |
| Carrier | 2 | 2 | 2 | 2 | 2 | 2 | 2 |
| Silicone coupling agent | 2 | 2 | 2 | 2 | 2 | 2 | — |
| Irganon 1010 | 2 | 2 | 2 | 1.5 | 1 | 1 | — |
| Phosphite 168 | 2 | — | 2 | 2 | 3 | — | — |
| Tinuvin 622 | 1 | 1 | — | 2 | — | — | — |
| Chimassorb 81 | 1.2 | 1.2 | 1.5 | — | — | — | — |
| Light stability,hr. | 560 | 330 | 370 | 300 | 36 | 16 | less than 6 |

From above description of manufacturing principle and process of this invention, it shows the process is a breakthrough in the manufacture of spectacles. In the process, the procedures for raw material mixing and subsequent freeze-grinding have not been used before; on the application side, the process is not limited to the manufacture of wind shielding, light screening spectacles, and can be extended to watch cover, windows and wind shield of automobiles, floats of fishing rods etc., indicating the practical aspect of this invention.

In summary, this invention is an innovative concept with practical implication for the lowering of production cost and improvement of characteristics of wind-shielding, light screening spectacles. For these reasons, it is hereby to apply for patent right. It is pertinent to point out that the technical content, modification and amendment thereof shall not deviate from the scope of this invention as described in the patent claims.

We claim:

1. A method of forming a UV-screening photochromic lens material for eye glasses, comprising the steps of:
   a. providing a polycarbonate polymer as a substrate material for said lens;
   b. providing spironaphthoxazine as a photochromic composition;
   c. providing a carrier for said photochromic composition;
   d. combining 7 weight percent of said spironaphthoxazine and 2 weight percent of said carrier with 82.8 weight percent of said polycarbonate;
   e. providing a silicone coupling agent;
   f. providing a hindered phenol antioxidant;
   g. combining 2 weight percent of said silicone coupling agent and 2 weight percent of said antioxidant with said combination of step d;
   h. providing an organic phosphorous stabilizer;
   i. providing an amine light stabilizer;
   j. providing an ultraviolet light absorbent;
   k. combining 2 weight percent of said organic phosphorous stabilizer and 1 percent of said amine light stabilizer and 1.2 weight percent of said ultraviolet light absorbent with said combination of step g;
   l. mixing said combination of step k;
   m. cooling said mixture of step l to a temperature within a range of 0° to −40°C.;
   n. pulverizing said cooled mixture of stem m to a particulate diameter size within a range of 0.1–0.7 mm; and,
   o. molding said pulverized mixture at a temperature within a range of 180° −200° C. and a pressure within a range of 500–2000 kg/cm$^2$.

* * * * *